United States Patent [19]

Satkamp

[11] Patent Number: 4,685,184
[45] Date of Patent: Aug. 11, 1987

[54] SELF-LUBRICATED TRACK-ROLLER BEARING AND METHOD OF CONSTRUCTING THE SAME

[75] Inventor: Gary A. Satkamp, Valparaiso, Ind.

[73] Assignee: McGill Manufacturing Company, Inc., Valparaiso, Ind.

[21] Appl. No.: 857,980

[22] Filed: Apr. 25, 1986

Related U.S. Application Data

[60] Division of Ser. No. 653,480, Sep. 21, 1984, abandoned, which is a continuation-in-part of Ser. No. 332,505, Dec. 21, 1981, abandoned.

[51] Int. Cl.$^4$ .......................... B21D 53/10; B21K 1/04
[52] U.S. Cl. .......................... 29/148.4 R; 29/148.4 C; 29/148.4 L; 29/149.5 R; 29/149.5 C; 29/149.5 S; 29/149.5 NM; 29/447; 29/DIG. 1; 384/275; 384/298
[58] Field of Search ............. 29/148.4 R, 148.4 A, 29/148.4 C, 148.4 L, 149.5 R, 149.5 C, 149.5 S, 149.5 NM, 428, 434, 439, 440, 447, DIG. 1; 384/275, 298

[56] References Cited

U.S. PATENT DOCUMENTS

| | | | |
|---|---|---|---|
| 2,638,429 | 5/1953 | Patterson | 29/149.5 R X |
| 3,266,123 | 8/1966 | McCloskey | 29/149.5 R X |
| 3,874,050 | 4/1975 | White | 29/149.5 NM X |
| 3,891,488 | 6/1975 | White | 29/149.5 NM X |
| 4,137,618 | 2/1979 | Krauss | 29/149.5 NM X |
| 4,379,009 | 4/1983 | Shibata et al. | 29/447 X |
| 4,442,578 | 4/1984 | White | 29/149.5 NM X |
| 4,462,144 | 7/1984 | White | 29/149.5 NM X |

FOREIGN PATENT DOCUMENTS 135227 10/1980 Japan .......................... 29/149.5 NM

*Primary Examiner*—Howard N. Goldberg
*Assistant Examiner*—Ronald S. Wallace
*Attorney, Agent, or Firm*—Foorman L. Mueller

[57] ABSTRACT

A self-lubricating track-roller bearing and the method of manufacturing the same that includes such a bearing with an inner race ring having a liner of self-lubricating material bonded to the outer surface of the inner race ring which is manufactured by the use of such a liner having self-lubricating material on one side and adhesive on the other side, with the latter side applied to such inner ring outer surface, positioning such inner ring with the liner thereon and a transparent heat shrinkable tubing assembly fixture together in a concentric relation so that upon the application of heat to said fixture it shrinks into a circumferential contact with the said liner to exert a force as the shrinking occurs to press said liner and said adhesive thereon against said outer surface to bond the latter thereto and thereby compress the thickness of said self-lubricating material, with said heat-shrunken tubing fixture maintaining said liner in position during additional heating to cure said adhesive, then removing said tubing fixture from said inner ring by cutting the same in an axial direction and then disposing of the cut fixture, and thereafter assembling said inner race ring with said liner thereon within an outer race ring to provide a self-lubricating track-roller bearing for an installation wherein said outer ring is rotatable and said inner ring is stationary relative to said outer ring.

14 Claims, 21 Drawing Figures

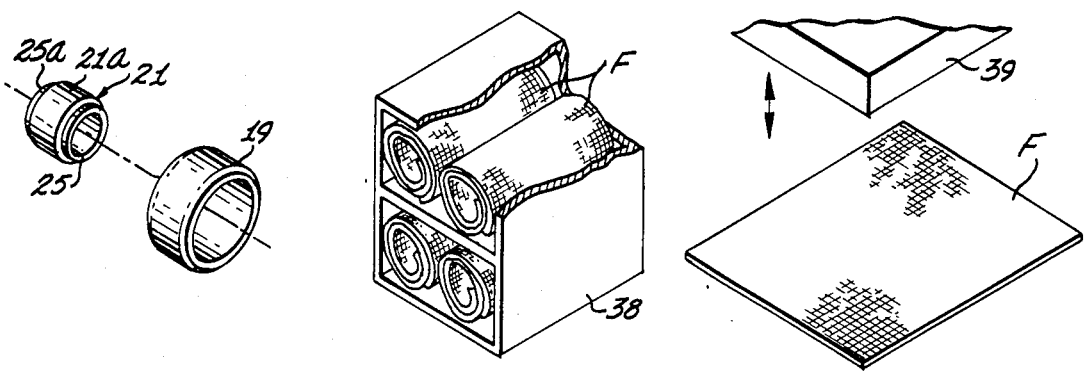
Fig.-5a  Fig.-5b  Fig.-5c
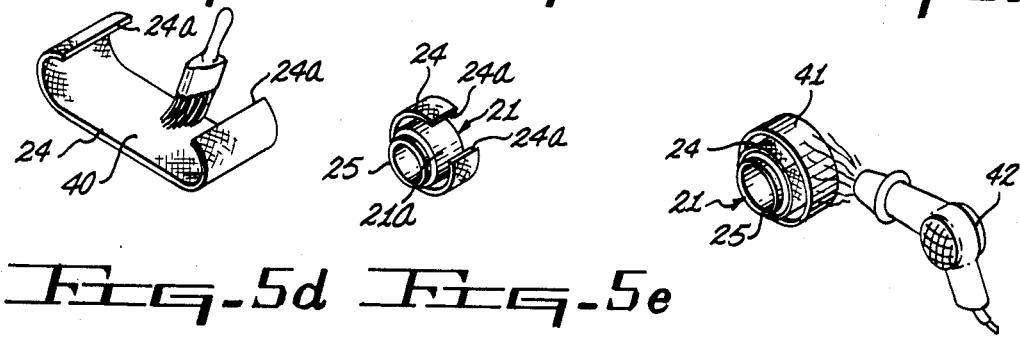
Fig.-5d  Fig.-5e  Fig.-5f
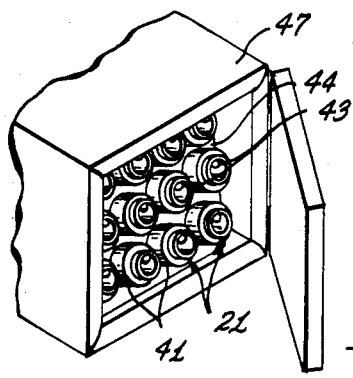
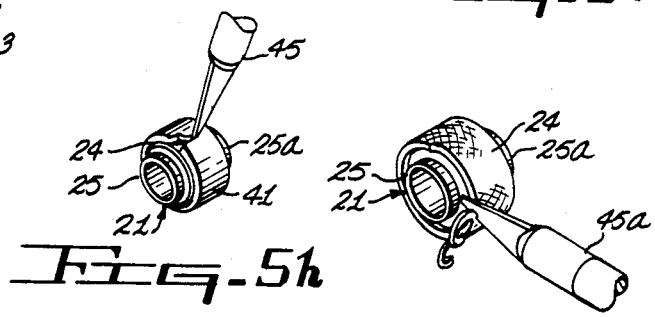
Fig.-5g  Fig.-5h  Fig.-5i
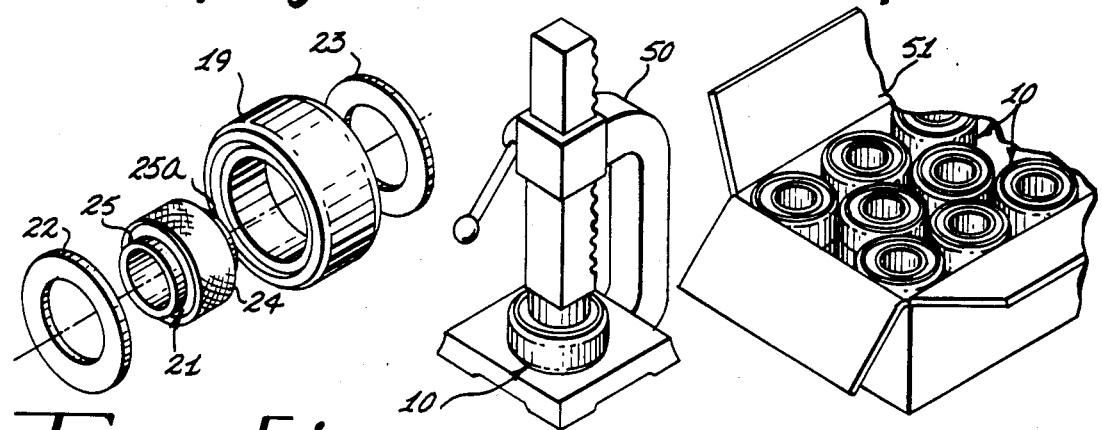
Fig.-5j  Fig.-5k  Fig.-5l

SELF-LUBRICATED TRACK-ROLLER BEARING AND METHOD OF CONSTRUCTING THE SAME

This is a divisional application of the continuation-in-part filed Sept. 21, 1984, Ser. No. 653,480, now abandoned, of the parent application filed Dec. 21, 1981 as Ser. No. 332,505, now abandoned.

BACKGROUND OF THE INVENTION

The track-roller bearing of this invention comprises an outer member or outer race ring and an inner member, or inner race ring within the outer member, and a self-lubricating fabric liner secured or bonded to the outside surface of the inner member. With the liner so secured in the bearing, unexpected premature failures of the bearing are avoided, and the life of the bearing is prolonged and is predictable. The invention also includes a method of constructing such a bearing.

In the self-lubricated bearing art wherein the lubrication is provided by a lining between the movable parts of the bearing, an early patent in this art U.S. Pat. No. 2,350,398 on a rod end bearing filed Dec. 6, 1940 and issued June 6, 1944 had a flexible fabric liner secured to the inside of the outer or socket member providing a lubricated or lubricating surface in engagement with the ball within the socket. In the subsequent 40 years, many millions of self-lubricated bearings of different constructions have been manufactured using such a liner within the bearing, and although the rod end type of bearings represented a substantial part of that number, a liner for lubrication has also been incorporated in other types of bearings such as journal bearings, spherical bearings or self-aligning bearings, special bearings of various types, and track rollers. These are generally bearings for an installation where relative speed of movement between the two bearing parts is low and in the range of substantially zero to 20 surface feet per minute. Lined bearings of the type under consideration here eventually fail due to wear-out of the liner system and such wear-out is a function of the load times the differential in movement between the two bearing members. Thus, if a very heavy load were applied the speed of rotation must be very slow in order to obtain satisfactory life. Conversely, under light loads relatively higher speeds can be accommodated.

With the advent of polytetrafluoroethylene material sold under the trademark TEFLON, that material has been used in the fabric liner successfully, and has contributed to the wider use of self-lubricated bearings as described above. Also contributing to the broadening use of lined self-lubricating bearings is the fact that they will operate successfully in a wide temperature range, are resistant to different corrosive environments, and being self-lubricating, maintenance is reduced, and their life is superior in many installations relative to the life of a conventional anti-friction bearing for such an installation.

Over this long period of use of the self-lubricating bearing, the liner has been bonded to the inner surface of the outer race member of the bearing. The adhesive or bonding material is of a liquid or soft consistency when the liner is bonded to a bearing part surface, but it becomes hard when dried and the bearing is ready for and is put into commercial use. For some of the types of bearings the liner with such bonding has provided a satisfactory wearing condition and life. However, for a track roller with an unsupported rotating outer race ring and where the load accommodated by the bearing is applied on such outer race ring, it has been found that the continuous compression-relaxation cycling with every revolution of that outer race ring in the relative movement between the track and the bearing, the liner material itself adhering to such inner surface of such outer ring breaks up or disintegrates thereby ruining the liner. In fact, it appears that such continuous working of the fibers as they enter and exit from the load zone results in breakage of the individual fibers. The fabric breaks down and pulls apart, and the load then forces it to flow out of the bearing. The liner is thus destroyed and the bearing must be replaced. Because the self-lubricated track roller may be installed in a relatively inaccessibleplace, and because the destruction of the liner and termination of bearing life is not readily predictable, it is necessary to either check on the condition more frequently than should be required or suffer the consequences of failure due to such destruction at a very inopportune time. Hence, the matter of checking on the bearing condition and life and the replacement of the bearing pose very serious and costly problems in the care of the equipment with which the bearing is installed. However, the practice of bonding such fabric liner to the inside surface of the outer race is universal in the structure used commercially in this field of bearings for all of the long period of use, and such practice continues. The resulting problem in self-lubricated lined track rollers so assembled has remained unsolved until the present invention.

In the bearing of the present invention, and in the method of constructing such bearing, the fabric liner is bonded to the outer surface of the inner ring, which remains stationary during bearing operation. The bonding agent hardens when it is completely dried, the inner ring remains stationary when pressure is applied during operation, the bond is maintained for the life of the bearing, and the fabric does not break down prematurely and pull apart. The life is uniformly predictable in such a track roller.

The extensive patent art on lined self-lubricating bearings confirms the consistent practice over the years in the patented bearings referred to above with respect to the method of manufacturing such bearings and the method of bonding the fabric liner to the inner surface of the outer race ring or other bearing part, except for the McCloskey U.S. Pat. No. 3,266,123 filed Apr. 7, 1965, and issued Aug. 16, 1966. This is on a self-aligning bearing assembled by deformation of the outer bearing member which is discussed in the Prior Art Statement filed herewith and points out that the liner is described as being optionally adhered to one of the members of the bearing as between the inner and outer members. In view of the long and consistent practice in the industry up to the present time of bonding the liner to the outer member, this optional very sparse description in 1966 showed a total lack of knowledge of the differences between bonding of the liner in these two different positions in that type of bearing, and very clearly failed to teach the art the advantage of bonding the liner to the inner member of a track roller as in the present invention.

The track roller of the present invention is a different type of bearing with different applications for the same than a self-aligning bearing. In the three examples described in the sentences beginning in column 2 line 51, and column 3 line 24 and line 34 of such McCloskey patent, the liner is specifically described by McCloskey as bonded to the outer member. In commercial practice, self-aligning bearings are manufactured by deforming the outer ring over the ball and when a self-lubricated liner is used, it is placed in the inside of the outer race ring for bonding thereto. When the outer race ring is deformed to enclose the ball, the adhesive on the liner is secured to the inside of the outer race ring just as McCloskey describes the liner in the outer race ring in columns 2 and 3 above. In a track roller the outer race ring must be hard and non-deformable in the manner of the self-aligned bearing, the inner race ring cylindrical, and the assembled bearing is not misalignable.

Contrary structurally to the McCloskey patented bearing; the inner and outer members of the present bearing invention are normally machined in their ultimate condition with a cylindrical raceway on the inside of the outer member, and an outer cylindrical surface for the inner bearing member. These bearing members do not lend themselves to deforming into a different configuration during manufacture as in McCloskey. The adhesive for the self-lubricating fabric liner is provided on only one side as contrasted to an optional placement on either side, and that adhesive is adhered to the outer surface of the inner member.

The track roller of the present invention and the self-aligning bearing of the McCloskey patent are thus very different structurally, and are used in very different applications such that one must describe them as being in different families, and of materially different types in the bearing field. This fact is further illustrated in that a self-aligning bearing must of a certainty be structured to accommodate a thrust load, while a track roller is not specifically designed for a thrust load because the installation thereof does not normally produce a thrust force.

SUMMARY OF THE INVENTION

It is an object of the present invention to provide an improved track-roller bearing with a self-lubricating liner and a longer life, and a method of making such a bearing.

A further object of the present invention is to provide a track-roller bearing with a self-lubricating liner therein that will operate in extreme environmental conditions as well as in normal operating conditions, make it possible to have a predictable life for such a bearing and thereby accomplish the most desirable maintenance conditions for the bearings in both relatively inaccessible installations and in more normally accessible installations.

A still further object is to accomplish these objectives by manufacturing the bearings with the self-lubricating liner bonded to the outer circumference of the inner race ring and with that race ring assembled within the outer race ring of the track-roller bearing.

It is also an important object of the present invention to provide apparatus with which to practice an efficient and reliable method for such manufacture to assemble such liner onto the outer surface of the inner race ring so as to lay smoothly on such surface in a rugged bond, and to assemble such inner race ring and an outer race ring to provide the track-roller bearing of this invention.

The track-roller bearing of the present invention is constructed with an inner race ring or member which is supported on an axle, or it can be integral with a mounting stud, either of which is mounted stationary in the part of the equipment in which the bearing is to operate, while an outer race ring outside such inner ring is in direct engagement with a self-lubricating liner bonded to the outside of such inner ring and upon which the outer race ring rotates and is supported. The loads or forces to be accommodated by a track-roller bearing vary widely, but the fully load must be accommodated by the outer race ring which is in rolling engagement with a track and which flexes under such load at each and every segmental portion of the rotation. Such load at the area of the application thereof in the rolling outer race ring is normally substantial and such outer ring is unsupported. On the other hand, the inner race ring is stationary and is supported on its axle or at its axis and it retains its circular configuration relative to its axis under the load applied to the outside of the outer race ring, but transmitted to such supported inner race ring.

The self-lubricating liner comprises a fabric containing TFE fluorocarbon fibers with the letters "TFE" meaning tetra-fluoro ethylene. Satisfactory liners have been obtained from Stern and Stern Textiles, of Hornell, N.Y., and from Fenner America, of Middletown, Ct. Each such liner fabric has a lubricating characteristic on one side that eliminates the necessity during the life of the bearing of providing grease or other normal lubricants together with rollers, or balls, for instance, between the race rings which is the conventional structure for anti-friction bearings. The fabric has a bondable fiber on the other side and can be supplied when purchased with an adhesive that can be softening by a solvent and permits the fabric to be bonded to the outer surface of the inner race ring. Also, an adhesive can be applied to such other side after the fabric is cut for application to the race ring surface. Epoxy resin adhesives from H. B. Fuller of Grand Rapids, Mich., are very satisfactory. When the fabric is originally supplied with an adhesive on one side, a solvent is brushed on or otherwise applied immediately before the liner is to be applied to the inner race ring, and the generic solvent to act on and make the adhesive sticky for ready bonding thereof is one containing methyl-ethyl-ketone and/or methylene chloride.

Such known bonding materials for securing the fabric liner to a race ring harden when cured, and with the liner so secured to a rotating outer race ring, the individual fibers in the fabric break or fracture with time causing utlimate tearing of the fabric over its total dimension. Because of the adaptability of track rollers to many types of installations and expected lesser maintenance than a lubricated anti-friction bearing which must be periodically greased or oiled, the installations of the self-lubricated type, such as the present invention, are normally in less accessible locations. If a conventional self-lubricated bearing with the liner on the inside of the outer race ring had a reasonably predictable life, replacement could be scheduled for whatever time period experience would indicate. However, the life of such prior bearings being erratic due to the unpredictability of the time for the breakdown of the liner for the rasons discussed above, it has meant that such bearings may be replaced too soon, thus increasing the cost of the bearings and the labor for replacing the bearing, or the breakdown occurs when not expected creating an emergency which normally would be even more costly.

It has been found in the use of the present invention tha the life of the liner and hence the bearing can be increased and more accurately determined through testing or experience in use, and the replacement of a bearing can be scheduled on a consistent basis. Furthermore, in addition to the savings represented in such a result, the track-roller bearing of the present invention has been found to provide a life which is at least forty percent (40%) longer than the minimum life of a track-roller bearing with such a liner on the outer race, and experience shows an even greater percentage than this in the longer life of a bearing of this invention. A typical installation for a self-lubricated track-roller is in a flap system in an aircraft which is illustrated in the drawings herewith where the track-roller operated on an "I" beam shaped structure which is attached to the main root of the airplane wing and there is a ball screw mechanism which extends a flap carriage assembly in and out. The flaps themselves are attached to the carriage assembly. In a typical installation on a large commercial plane using such a construction, as many as two hundred fifty (250) track-roller bearings are installed in each wing structure. These are quite inaccessible for ready and easy inspection or replacement, and the advantage of a predictable and longer life for such bearings is readily understood.

DESCRIPTION OF THE DRAWINGS

FIGS. 5a–5l are the identification for a diagrammatic illustration for each of the series of manufacturing steps for bonding a self-lubricating liner to the outer surface of the inenr race ring of a track-roller bearing, and then assembling that inner race ring and an outer race ring to complete said bearing wherein;

FIG. 5a is an exploded view of just the inner and the outer race rings;

FIG. 5b illustrates the liner material as packaged and received for the manufacturing operation with the top portion of the package broken away to show the rolls of fabric therein;

FIG. 5c illustrates a piece of liner material as in FIG. 5b ready to be cut into a liner piece or pieces;

FIG. 5d illustrates diagrammatially a liner piece that has been cut to size, and is ready for the application of a solvent to the adhesive to make it sticky when the adhesive has been applied to the liner material when manufactured. The Figure also illustrates the alternative situation, i.e., the application of adhesive if none was provided on the fabric when the latter was manufactured;

FIG. 5e shows an inner race ring with a liner piece having adhesive on one side as it is placed on the outer surface of said ring;

FIG. 5f is a diagrammatic illustration of a disposable heat-shrinkable tubular assembly fixture with which the assembly of FIG. 5e is positioned, and of a heat gun to apply heat and preliminarily shrink said fixture to adhere the liner to the inner race ring;

FIG. 5g illustrates the assemblies completed as per FIG. 5f, and each hung on a peg on a board placed in an oven for heating all such assemblies to maximize the shrinking of the fixture and to cure the adhesive;

FIG. 5h illustrates an assembly taken from the oven of FIG. 5g, and the step wherein a sharp knife cuts the assembly fixture from the liner for hand-removing the used fixture and disposing of the same after the adhesive is cured;

FIG. 5i illustrates the next assembly step wherein a sharp knife or the like is used to trim circumferentially each opposite axial edge of the bonded liner to remove portions respectively extending beyong the axial width of the inner ring outer surface for receiving the liner;

FIG. 5j is a perspective view of the parts for the complete assembly of a track-roller bearing with the inner race ring thereof having a liner bonded to the outer surface of such inner ring as in FIG. 5i;

FIG. 5k is an illustration of a punch press to diagrammatically show the peening of the axial extensions on the inner race ring for retaining end plates thereon;

FIG. 5l is symbolic of a package of manufactured bearings of the present invention completely assembled and ready for subsequent handling;

DETAILED DESCRIPTION

Figure 1:
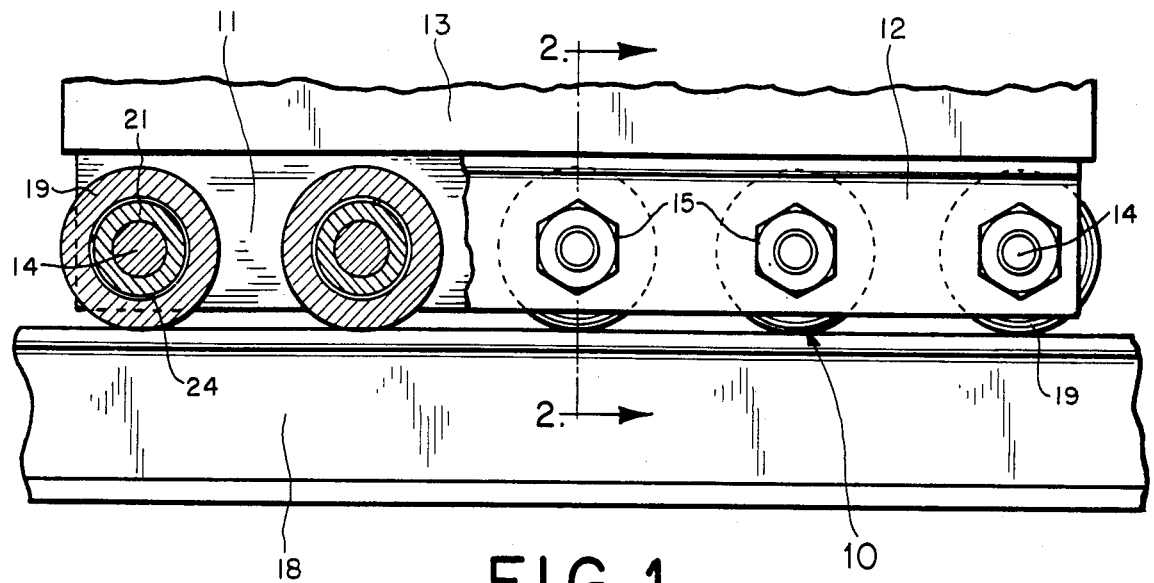
FIG. 1 is a side view of a typical installation of a plurality of track-roller bearings of the present invention on a track in the wing and flap assembly of a plane.
Figure 2:
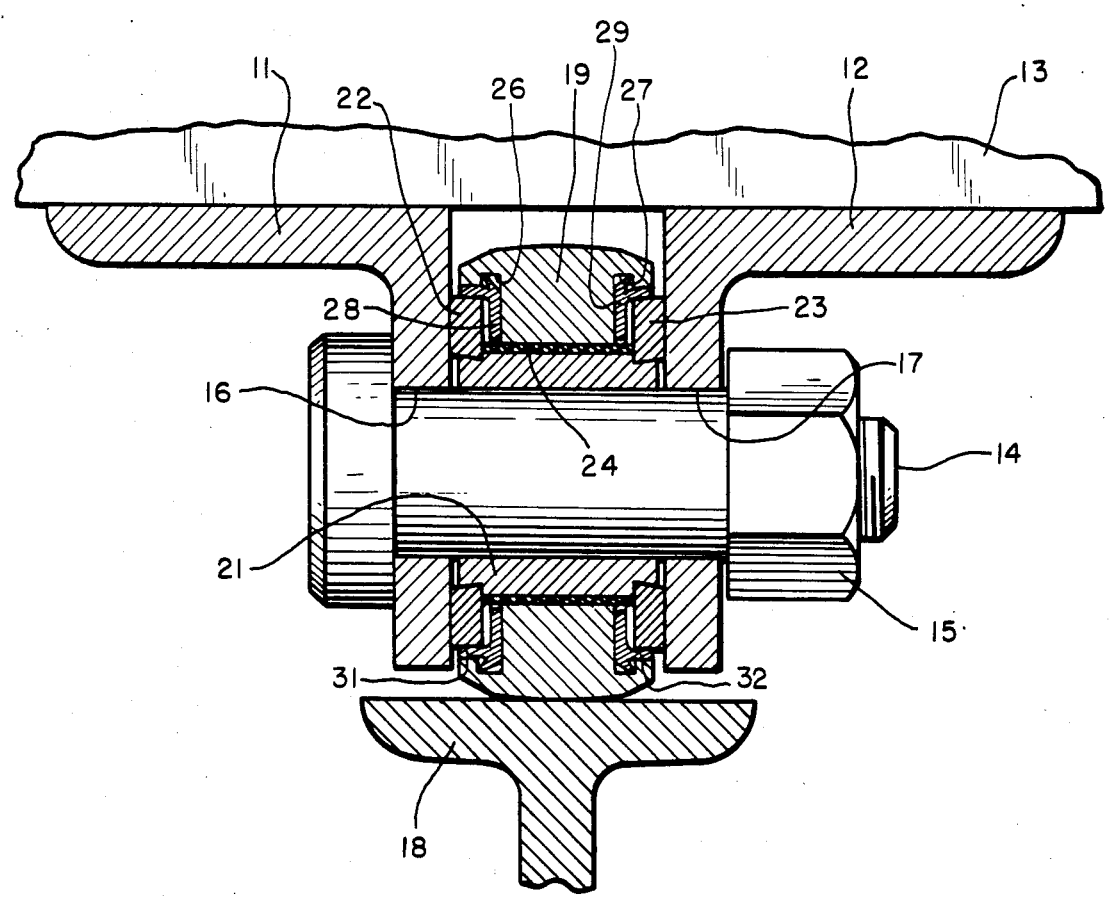
FIG. 2 is an enlarged cross-section along the line 2—2 of FIG. 1 showing particularly the present bearing having an axle which in turn is supported in a bracket mounted on the flap with the "I" beam shaped track mounted on the wing of a plane.
Figure 3:
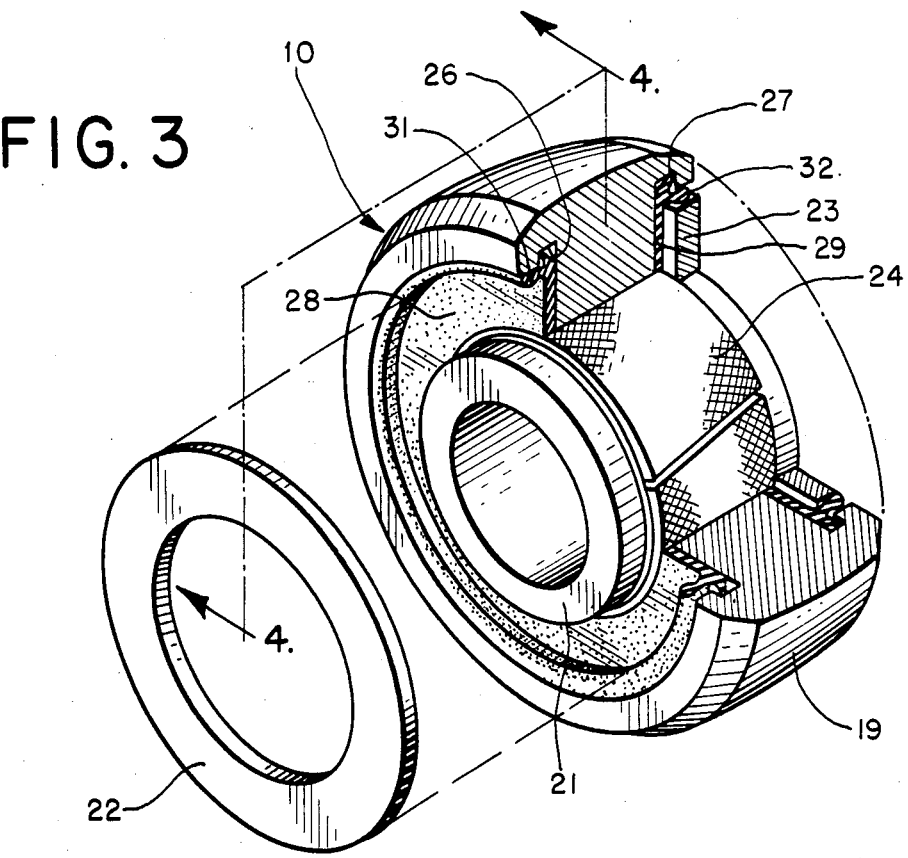
FIG. 3 is an enlarged perspective of the track-roller bearing partially in section to show the liner on the inner race ring and seals within grooves in the outer race ring to keep dirt and the like out of the bearing.

In order to make the construction and operation of applicant's track-roller bearing invention more understandable, a typical installation is shown in FIGS. 1 and 2 wherein the bearing 10 itself from FIG. 3 is mounted in a bracket comprising L-beams 11 and 12 (FIG. 2) each of which is rigidly secured to the wing member 13, with each bearing 10 supported on an axle 14 in corresponding apertures 16 and 17 in the L-beams. A nut 15 which will be tightened on the threaded end of the axle maintains the bearing securely in place and such axle fixed in the installation with the inner race ring stationary. The stationary track 18 upon which the outer race ring of the bearing rolls is in the shape of an I-beam, and again, in a typical installation in a plane as being described here, each such track may have mounted thereon as many as sixteen (16) track rollers. It is understood that the track 18 is stationary in the installation illustrated and each bearing 10 moves on such track 18 with the moving carriage assembly. Such assembly includes the two L-beams 11 and 12 secured to the wing member 13.

Referring now to FIGS. 2 and 3, the bearing of the present invention as illustrated comprises an outer race ring 19, an inner race ring 21, and end plates 22 and 23, with the end plate 22 displaced in FIG. 3 for illustrative purposes. A fabric liner 24 is bonded to the outside circumference of the inner ring 21 as shown in FIG. 2 in cross-section, and in a portion thereof in FIG. 3.

The liner material is a commercially available product, as previously described, with lubricating characteristics, and it is bonded and secured to the surface of the inner ring by an exposy resin which can be applied in a soft condition to the surface of the liner to directly engage the race ring surface. When the epoxy resin dries and cures it bonds the liner to the ring.

The outer race ring 19 of the bearing as illustrated includes a circumferential grooves 26 and 27 (FIGS. 2 and 3) in which seals 28 and 29 are carried, each seal having an extension in one of the respective grooves 26 and 27. A circumferential body portion of each seal lays in the space between the two end plates 22 and 23 and within an extension of a groove as in FIG. 2. Substantially right-angled projections 31 and 32 (FIG. 3) on the seals 28 and 29 respectively extend into recesses shown in FIGS. 2 and 3 between the outside of the end plates and the inside of the bores for the grooves 26 and 27 of the outer ring 19. This is conventional sealing structure for an anti-friction bearing, which normally acts to keep lubricant in and dirt and other harmful materials out of the interior of the bearing. Here, it is to keep dirt and other harmful materials out.

The inner race ring assembly and the outer race ring 19 are maintained as a track-roller bearing with the seals 28 and 29 by means of the end plates 22 and 23 peened in locked position on the inner race ring 21 as shown in Fig. 2, with the latter stationary on the axle 14 and the outer race ring 19 rotating thereon in engagement with the self-lubricating fabric liner 24. The complete bearing separate from the axle 14 is shown in FIG. 3, with a cut-away portion removed down to the fabric liner 24. The separation of the ends of the liner 24 in this broken away portion is merely for illustration purposes, and the abutting relationship for such ends 24a is shown in the finished position for such liner in FIGS. 7 to 10 inclusive.

As an example of the load carried by a plane installation as described above, the wing of the plane may exert as much as 4300 pounds on each bearing as shown in FIG. 1. Looking at FIG. 2 that load is applied first on the rotating outer race ring 19, then through the lubricating liner 24 to the inner race ring 21, stationary relative to the outer race ring, and then to the axle or pin 14. Such load is applied from point of contact to point of contact of the outer member 19 with the track as such outer member rotates and in that way engages the track over 360° in a complete revolution of such member. However, the inner race ring 21 is stationary on the axle 14 and such load is transmitted through to such inner ring only over some 120° of the circumference, or only over a segmental portion of the complete circumference. It might not be apparent to the naked eye during an operation utilizing the bearing, but there is a flattening of the unsupported outer ring 19 of the bearing at the point of contact with such outer race ring and that flattening at such point causes an action as flexing in the outer race ring itself. The engagement of the inner raceway of the outer race ring with the liner on the outside of the stationary inner race ring causes the wear on the liner to be confined to that segmental portion referred to above, and during the life of the liner and the bearing the nut 15 can be loosened and the inner race ring rotated to expose another segmental portion of the liner to wear. The nut 15 is then tightened again.

With a liner bonded by an epoxy resin to the inside surface of the outer ring as in prior track rollers, over a period of time and with many rolling movements of the bearing on the track, the fibers of the fabric liner fracture. This leads to the destruction of the fabric liner and the bearing must be replaced.

No such fiber fracture occurs on the inner race ring as 21 for it is supported on the axle 14 and is stationary. Accordingly, the life of the stationary liner in the present invention is determined by wear in the relative rotation between the outer and inner race rings. By testing an installation under operating conditions or by actual use of the track-roller bearing, the life can be determined for a particular liner material as 24 (FIG. 2). To make an outer race ring so thick as to preclude such flexing would make it so heavy that the track-roller bearing would be impractical. To provide the track roller within a practical cross-sectional dimension means that the cross-sectional dimension is such as to have such flexure. However, the prior art has continued to bond the liner to the inside of the flexure-prone outer race ring of track roller.

It is understood that in an installation such as that of FIGS. 1 and 2, the track 18 could be moved relative to the bearing assemblies. In such case, the outer race ring would rotate relative to longitudinal movement of the track, for instance, while the inner race ring would be stationary on the axle or pin 14.

Figure 4:
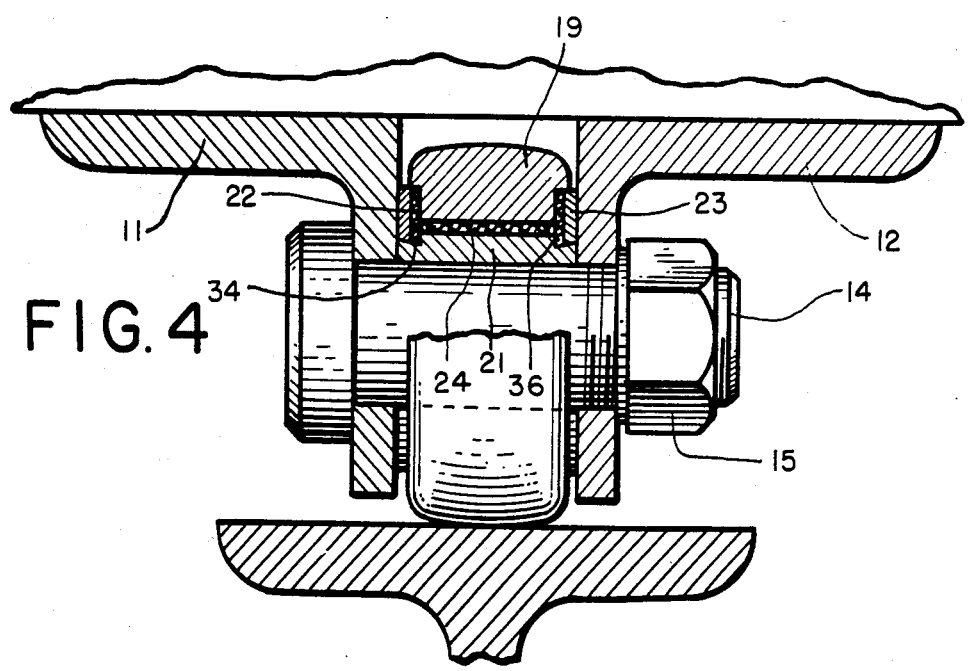
FIG. 4 is a view somewhat like FIG. 2 showing a modification of the bearing with liner material on the inside of each end plate to absorb incidental end thrust in the bearing and provide sealing while maintaining the same lubricating factor between the inner and outer race ring.
Figure 6:
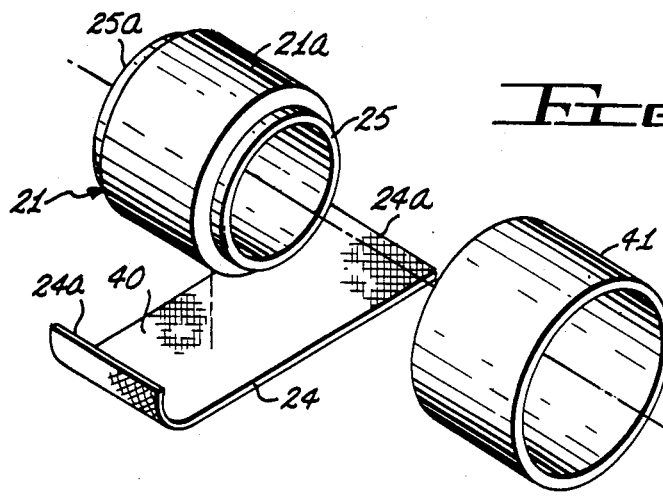
FIG. 6 is an enlarged illustration in perspective of the self-lubricating liner, an inner race ring to which it will be bonded, and the disposable assembly fixture of heat shrinkable tubing to be used as illustrated in FIG. 5f.

A modification of the bearing is illustrated in Fig. 4, wherein liner material 34 is bonded to the inside of end plate 22 and liner material 36 is bonded to the inside of end plate 23. The circular liner material 34 and 36 serves as a bearing seal, and is able to accept thrust loading as well. It is difficult to avoid some misalignment in the track-roller bearing or in the equipment supported by the bearing. This can subject the bearing to an incidental end thrust, but such thrust is taken up at the circular collar pieces 34 and 36 with no loss in self-lubrication.

Each step in the complete manufacturing operation and the materials and apparatus used in that operation have been found to contribute to an effective, dependable and quality-generated method providing a commercially-sound track-roller bearing with an unexpected and surprising performance. The steps are illustrated diagrammatically in the series of Figures including the number 5, and together with the following description and the enlarged illustrations of FIGS. 6 to 10 inclusive provide both a complete description and illustration of the bearing structure of FIGS. 1 to 3 and the method of manufacturing the same.

More specifically; FIG. 5a illustrates the machined inner and outer race members 21 and 19, respectively, as shown in FIGS. 2 and 3 which are transferred from production machines in a general bearing manufacturing area to a closed manufacturing area for the present bearings that is maintained as an oil-free well ventilated environment. Furthermore, no oil or petroleum produce should come in contact with the bearing parts or liner fabric during the manufacture in such closed area, and work surfaces, hands, and production fixtures must be dry. For the best bonding of a fabric liner to the inner ring, as 24 in FIG. 3, or a corresponding member as that shown in FIG. 5d which is being prepared for bonding, it has been found that vapor blasting of the outer surface 21a (FIG. 5e) of such inner ring will properly condition such outer surface for the linner bonding. Sand blasting can also be used, and either blasting step will provide a non-directional roughening of the outer surface to insure full adhesion of the liner 24 in the bonding step.

Liner material is manufactured from interwoven TFE and polyester or fiberglass fibers, and preferably bonding adhesive covers the polyester or fiberglass side of the fabric when the fabric is manufactured. The opposite side includes TEFLON for self-lubrication which will be in contact with the inside surface or raceway of the outer race ring 19 in the assembled bearing. To prevent deterioration of the adhesive from the time the rolls of fabric are unpacked until the liner material is cut to size for bonding to the outer surface of the inner ring 21, the storage box 38 is maintained in refrigeration. The uncut fabric material designated F as shown in the storage box in FIG. 5b has the fibers on each side thereof extending parallel to and at right angles to the edges of the material and to illustrate that formation, the top and half of the face side of the box 38 are removed to make the fabric surface visible.

Figure 7:
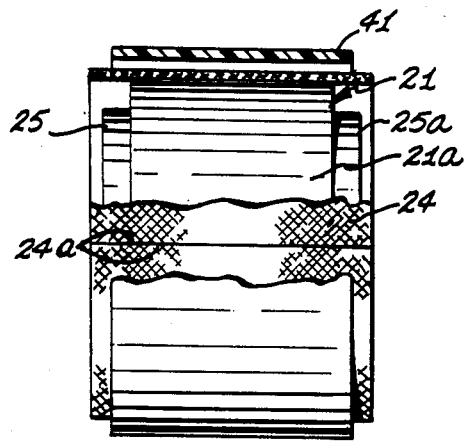
FIG. 7 is an enlarged illustration of the bearing parts positioned within the disposable assembly fixture of FIGS. 5f and 6, with the latter broken and spaced away from the liner of the inner face ring to show the relative position thereof, and with the liner broken away to show the outer surface of the inner race ring.
Figure 8:
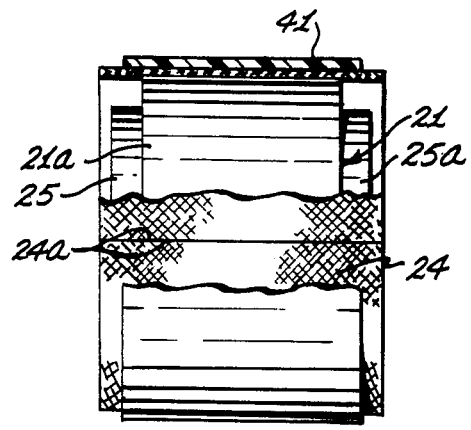
FIG. 8 shows full shrinkage position of the fixture and the liner bonded and cured after the heating step of FIG. 5g.

Each liner piece 24 is cut from the fabric F by a rule die cutter 39, with a portion of such cutter shown in FIG. 5c positioned for up and down movement in its cutting operation. The direction of the fibers on each side of the material F parallel to the edge and at right angles thereto is shown on the top side as the piece of fabric lays in FIG. 5c. When the larger piece of material as received is cut to size into individual liner pieces 24, the cuts for the latter are made at 45 degrees relative to the direction of the fibers as such fibers are illustrated in FIGS. 5b and 5c before such cutting. The liner 24 in FIGS. 5d and 6 after such cutting to size is shown with the fibers in the 45 degree direction relative to the edge. The liner is cut to size in a flat form to the exact length to encircle the outside of the inner race ring with the ends 24a abutting but not to overlap at the ends of the liner as finally bonded. As shown in FIG. 5d, the ends are turned up for illustration purposes only showing the 45 degree direction for the fibers on both sides. The entire lubrication in the complete bearing is provided by the liner and the self-lubricating material thereon, and it must be coextensive in width with the outside surface of each inner race ring. To insure such coverage and to make it possible to grasp and move the liner within the assembly fixture, if a slight adjustment is needed, such liner is cut wider than the outer surface and wider than the assembly fixture is long as shown in FIGS. 7 and 8. The illustrations in FIGS. 5h and 5i are too small to show this relationship, and they are merely diagrammatic.

With each liner piece 24 of the desired size, methyl ethyl ketone or methylene chloride solvent is applied or treated by brush to the adhesive side 40 of the liner piece or strip (FIG. 5d) to cause it to be sticky. The liner strip 24 is promptly placed by hand onto such outer surface 21a treated for the best adhesion, as previously explained, with the adhesive side 40 next to such surface as illustrated in FIG. 5e. This figure shows the liner 24 on or at the race ring surface 21a, but with the ends 24a separated as it is being wrapped onto such surface 21a.

Figure 9:
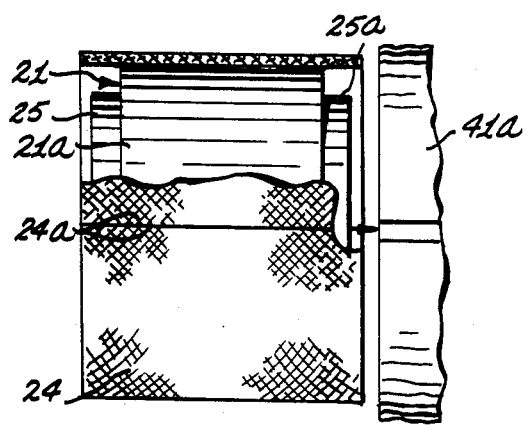
FIG. 9 illustrates the inner race ring after removal of the disposable fixture in the step of FIG. 5h but before the liner is trimmed as in FIG. 5i, with a broken portion of the cut-away disposable fixture displaced to the right.
Figure 10:
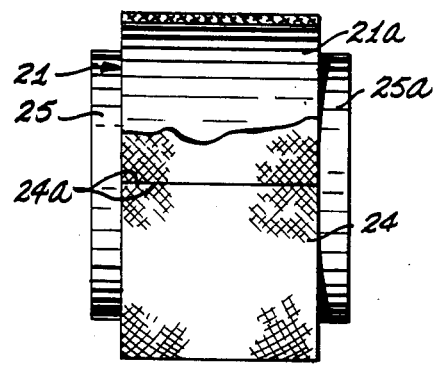
FIG. 10 is the inner race ring assembly ready to be assembled with the outer race ring with a portion of the liner and the inner race ring broken away.

When the liner is in contact over its length with the surface 21a and extending at each side over the circumferential seats 25 and 25a for the end plates 22 and 23 respectively as shown in FIGS. 7 to 9, that assembly of inner race ring and liner is centered within a piece of heat shrinkable transparent tubing 41 (FIG. 5f) of an appropriate length and inside diameter, as will be described more fully hereinafter. To more fully illustrate the heat shrinkable tubing 41 as an assembly fixture in the position of FIG. 5f, an enlarged illustration FIG. 7 has both the liner 24 and assembly fixture 41 broken-away showing the outer surface 21a of the inner race ring 21 with the liner 24 thereon and extending wider than the axial width of the heat shrinkable tubing 41, as well as the concentric relationship with one another. Merely to more fully illustrate such tubing 41 in FIG. 7, it is separated radially from the liner 24 as it would be for the initial positioning as an assembly fixture but the radial spacing away is not intended to be accurate. The seam portion of the liner occurs where the two free ends 24a of the liner are abutting in a smooth surface for the liner for engagement with the raceway within the outer race ring when the complete bearing is assembled.

It has been found that heat shrinkable polyolefin tubing purchased from United Techologies of Hartford, Conn., and identified by its trademark SUFLEX ASTRATITE type AVF, type 2, served very well as a disposable assembly fixture for heating and forcing the liner strip 24 into a tight and complete contact on its adhesive covered side with the outside surface 21a of the inner race ring for the beareing. Heat shrinkable tubing from Raychem Corp. of Menlo Park, Calif., identified as Thermofit RNF 100, Type 2, has also been used.

In FIG. 5f this assembly step for the liner and the inner race ring is illustrated diagrammatically to show a heat gun 42 with heat directed to the tubing fixture 41 to preshrink such tubing fixture so that it is holding the liner 24 (FIG. 8) onto the outer slurface 21a with the adhesive bonding to that surface in the applied position for the liner.

In a typical assembly operation for one size of bearing, an inner race ring with an OD of 0.745 inches, and with the liner 24 thereon, such ring and liner as a unit is originally spaced inwardly from the surrounding tubing fixture 41 having an inside diameter of one (1) inch and a shrink factor or 2:1. At this assembly step while the adhesive is still sticky and the position of the liner 24 is visible through the transparent tubing 41 around the race ring and liner, the latter can be grasped and its position adjusted by its width slightly greater than the tubing as shown in FIG. 7. When the tubing is preshrunk by the application of heat from a heat gun 42 (FIG. 5f) it shrinks radially inwardly to hold the liner 24 in a tight position around the outer surface 21a. The shrinkability factor of the tubing is provided by the manufactuer, and the initial range in inside diameter size is such that when fully preshrunken it will force the liner 24 to grip the outside surface 21a to which it has been applied with the adhesive on the inside of the liner 24 adhering to such surface. The junction of the two ends 24a of the liner at a seam as shown should be even and smooth and there should be no buckling in the fabric. As described above, prior to the curing and hence hardening of the adhesive the position of the liner on the race ring can be visually checked through such transparent tubing to insure that the liner is in its final assembly position.

With the preshrinking complete, the preshrunk tubing fixture 41 maintains the liner 24 in the proper position on the outer surface of the inner race ring 21, and this preassembly is picked up and placed on a corresponding hook or pin 43 on a board 44 which is supported on a stand (not shown with the board) in the oven 47 of FIG. 5g. The board 44 is of a size to accommodate the number of inner ring assemblies such that the weight thereof when full can be readily moved to the oven 47. The oven is heated to 350° F., and the assemblies are typically heated for 45 minutes for one size of the inner ring. It has been found that the tubing 41 does its measurable shrinking with the heat from the heat gun, and this heating step in the oven acts on such tubing 41 to apply a uniform maximum pressure to the liner while the adhesive is curing so that a consistent liner thickness is produced over the entire circumferential length with a uniform adhesive layer on the inside and the outside liner surface free of high or low spots. Any high spots, in particular, could become high pressure areas during bearing operation and cause bearing failure. FIG. 8 shows the condition of the tubing 41 when the heating step of FIG. 5g is complete and the adhesive bonding the liner 24 to the inner race ring is fully cured to a hard durable condition.

With each liner fully adhering to and cured on the outside surface of the race ring, a board 44 is removed from the oven 47, and the shrunken tubing or assembly fixture 41 on each assembly is ready for removal and disposal. It is cut with care axially in its position on the surface of the liner 24 and the race ring 21 so as not to damage the fabric. The cutting is done with a sharp instrument 45, such as a knife, in an axial direction as shown in FIG. 5h, after which it is removed from the surface of the liner 24 and disposed of. The condition of the inner ring 21 with the liner 24 bonded thereto after removal of the assembly fixture is shown in FIG. 9. The cut disposable assembly fixture is shown to the right of the main ring and liner assembly in FIG. 9, and because it is in a different physical condition than initially in its use it is identified by the reference character 41a for it is no longer in a tubing form, but could be flattened out if so handled. The ends 24a of the liner shown in the broken away portion of FIG. 9 abut in a very smooth connection for the best possible self-lubricating performance in the bearing operation.

The illustration in FIG. 9 shows the liner 24 extending beyond the width of the outer surface 21a and over the respective circumferential seats 25 and 25a or axial extensions, for the end plates 22 and 23 respectively, as the liner had been positioned from the time of the assembly step of FIG. 5e. This extended width permits grasping the same after being centered in the tubing assembly fixture 41 as described above and insures that the outer surface 21a of the inner race ring is completely covered by the liner during manufacturing and will be of a full width to provide complete lubrication when the outer and inner race rings are assembled into the track-roller bearing. The bonded fabric is trimmed by a sharp cutting tool 45a as shown in FIG. 5i, or by a knife as 45, to the respective edges of the inner ring surface 21a so that it is of the width as shown in full in FIG. 10 with the circumferential seats 25 and 25a exposed as such to receive the end plates 22 and 23, respectively. This trimming of the liner is easily accomplished without measuring because the bonded liner 24 is not supported over such seats and a sharp cutting tool will cut at the edge of the outer surface at each circumferential seat with the edge defining the cutting position.

The inner race ring is now complete and ready for assembly with the outer race ring. Four elements of the track-roller bearing are shown in perspective in FIG. 5j which correspond to the same elements in FIGS. 2 and 3, comprising the inner ring 21 with the liner 24 bonded thereto, the outer ring 19, and the end plates 22 and 23. The inner ring is assembled in the outer ring and the end plates 22 and 23 are respectively assembled on the corresponding circumferential seats 25 and 25a. This assembly is shown diagrammatically in FIG. 5k with a conventional hand press 50. The outer edge of each circumferential seat is peened when the press is operated for retaining the corresponding end plates in position, and in turn to retain the two race rings in assembled position. For the track-roller bearings which are to be operated in an environment where dirt, corrosive material, or the like may get into the bearing, a seal is provided on each side of the bearing as per seals 31 and 32 shown in FIG. 2. The seals are positioned before assembling the end plates 22 and 23 and peening the inner race ring at the respective circumferential seats, as described immediately above.

Simply to diagrammatically illustrate the completion of the manufacturing process, a box or carton 51 of finished bearing assemblies 10 is shown in FIG. 5l each of which correspond to the detailed illustration of a bearing in Fig. 3 of the drawings.

The specification for a representative size of a track-roller bearing of the present invention comprise the outer race ring 19 inside diameter at 0.776", with the width of the raceway for such ring 0.412". The inner race ring (as 21) outside diameter was 0.745", while the width of such ring at the outside surface thereof was 0.465". For assembly on such ouside surface of said inner race ring, the fabric liner (as 24) length was 2.37", and the initial width of the liner piece was 1" for application to such inner race ring outer surface. After the liner is trimmed or cut as in FIG. 5i the width was 0.465". The liner fabric used in this assembly was that of Fenner America, No. X-1276, which before bonding was 0.018" in thickness. After bonding and with the compression exerted by the heat shrinkable assembly fixture at its maximum shrinkage on the liner, the thickness of the latter was 0.015". This fabric was provided with adhesive on one side to be bonded to the outer surface of the inner race ring and had a self-lubricating material on the other side for engagement by the outer race ring raceway. To accomplish the adherence of the liner of the outside surface of the inner race ring and retain and compress said liner during oven heating, the heat shrinkable tubing of transparent polyolefin from United Technologies (Suflex Astratite type AVF, type 2) was 1" in original diameter with a shrink ratio of 2:1. The axial length of such fixture was ¾" or 0.750" whereby the liner 24 extended beyond the assembly fixture 41 during the manufacturing steps for grasping and adjusting the liner while the adhesive on the liner was still soft, and the fixture had not shrunken to the degree that it held the liner fixed on the outer surface of the inner race ring.

I claim:

1. In the manufacture of a self-lubricated track-roller bearing which comprises a cylindrical inner race ring with a cylindrical outside surface thereon and a cylindrical outer race ring with a cylindrical raceway on the inside surface thereof, the method for manufacturing said inner race ring with a self-lubricated fabric liner on said outside surface for engagement by said outer race ring cylindrical raceway when said track-roller bearing is operated in an installation, said method comprising:

(a) providing a self-lubricating fabric liner having adhesive on one side for bonding to the cylindrical outside surface of said inner race ring and having self-lubricating material on the other side thereof;

(b) placing said liner on said outside surface of said inner race ring with the adhesive on said outside surface;

(c) providing a disposable assembly fixture comprising a tubular element of transparent heat shrinkable material having an original internal circular dimension greater than the outer circumferential dimension of said inner race ring and said liner on the outside surface thereof;

(d) positioning said disposable assembly fixture of transparent heat shrinkable material and said inner race ring with said liner thereon so that said fixture is completely around said liner and in a position when shrunken to press said entire liner inwardly and press said adhesive against said outside surface;

(e) applying heat to said disposable assembly fixture to shrink it into a more pressing contact with the complete circumference of said liner and over the width of said liner to cause said adhesive to be maintained in a tight adherence to said outside surface of said inner race ring;

(f) placing said inner race ring with said fixture thereon in an oven to heat the same and maximize the shrinkage of said fixture on said liner and to cure by heat said adhesive to securely bond said liner to said outside surface of said inner race ring; and (g) removing said race ring with said liner and said fixture thereon from said oven and cutting such fixture on said liner, and thereafter removing the cut fixture from said liner and disposing of said fixture.

2. Th method for bonding a self-lubricated liner to the outside surface of the inner race ring for a bearing having an outer race ring assembled with said inner race ring, wherein said liner serves to provide lubrication for said bearing when in operation with relative movement between said two race rings, with self-lubricated liner material and with adhesive material available for accomplishing said bonding; wherein the improvement comprises the steps of (a) positioning said liner material on said outside surface of said inner race ring with adhesive material for bonding said liner material to said outside surface;

(b) providing a disposable assembly fixture comprising tubing of heat-shrinkable material of an original internal dimension greater than the circumferential dimension for said liner on said outside surface, (c) placing said tubing to be around said liner material and said inner race ring in a position substantially concentrically with respect to said liner material, (d) heating said tubing of said assembly fixture to shrink the same in a radial direction substantially equally circumferentially of said liner a dimension such that pressure is applied on said liner material to provide adherence thereof with said adhesive material to said outside surface, (e) further heating in a heated environment said assembly fixture tubing, said liner material, said adhesive and said inner race ring to maximize the shrinkage of said tubing on said liner material and complete the bonding of said liner material to said outer surface to provide an inner-race-ring-assembly, and (f) removing said inner-race-ring-assembly from said heated environment, removing said assembly fixture tubing from outside said liner material on said race ring, and disposing of the same, and preparing said inner race ring for assembly with said outer race ring to form a bearing.

3. The method of bonding a self-lubricated-liner to the outside surface of the inner race ring for a bearing as defined in claim 2 wherein said disposable assembly fixture comprises a predetermined length of heat shrinkable transparent tubing to surround said liner material on said inner race ring and afford a view of the liner and ring therein, with said heat shrinkable transparent tubing when positioned on said liner and race ring being of an inside diameter and of an axial length such that liner material is visible and the proper relative position therefor with respect to said outside surface of said inner race ring which is also visible can be ascertained prior to application of any heat to said tubing to shrink the same.

4. The method of bonding a self-lubricated-liner to the outside surface of the inner race ring for a bearing as defined in claim 2 wherein said disposable assembly fixture on said inner race ring assembly after said inner race ring assembly is removed from from said heated environment is mechanically cut so as to be removed from said ring assembly and is disposed of.

5. The method of bonding a self-lubricated-liner to the outside surface of the inner race ring for a bearing as defined in claim 2 wherein said tubing of said disposable assembly fixture on said inner race ring assembly shrinks radially inwardly substantially equally at all successive circumferential parts over the entire circumference thereof responsive to said initial heating and responsive to heat in said heated environment, and thereby applies a radial force on said liner and accomplishes the secure and complete bonding of said liner to said outside surface.

6. The method of bonding a self-lubricated-liner to the outside surface of the inner race ring for a bearing as defined in claim 2 wherein said disposable assembly fixture on said inner race ring assembly after removal of said latter from said heated environment is removable; the steps of cutting the tubing of said fixture to remove the same from the ring assembly and doing any trimming by cutting on said liner if required for providing said ring assembly in a final condition for assembly with an outer race ring.

7. In the manufacture of a self-lubricated bearing having an inner member with an outside surface thereon and an outer member with a raceway on the inside surface thereof, the method for manufacturing said inner member with a self-lubricated fabric liner on said outside surface for engagement by said raceway of said outer member when said bearing is operating in an installation thereof, wherein the improvement in said method comprises the steps of (a) applying a self-lubricated liner having adhesive therewith to said outside surface of said inner member, (b) placing a disposable assembly fixture comprising a length of heat shrinkable material around said liner on said inner member so that such heat shrinkable material covers said liner for the extent thereof as said liner is applied to said outside surface of said inner member, (c) applying heat to said heat shrinkable material to shrink the same until said shrinking is maximized on said liner and said liner having adhesive therewith is secured to said outside surface of said inner member to provide an inner member assembly, (d) and upon the completion of said securing of said liner to said outside surface of said inner member, removing said fixture of heat shrinkable material from said liner, and preparing said inner member assembly for assembly with said outer member to form a self-lubricated bearing.

8. The method as recited in claim 7 wherein said length of heat shrinkable material as a disposable assembly fixture is around said liner on said inner member and wherein said liner has an original thickness when applied to said inner member, and heating the heat shrinkable material to shrink the same for pressing said liner and adhesive against said outside surface so securely as to reduce in its final secured condition the original thickness of said liner.

9. The method as recited in claim 7 wherein said inner member is a cylindrical race ring and said outer member is a cylindrical race ring, and wherein said length of heat shrinkable material is tubing placed around said inner member and said liner on the outside surface thereof such that the axial dimension of said heat shrinkable tubing is concentric with the axis of said inner member.

10. The method as recited in claim 7 wherein the dimensional width of said self-lubricated liner is greater than the axial dimensional length of said heat shrinkable material as it is positioned around said inner member with said liner thereon and wherein said heat shrinkable material is transparent such that the liner is visible inside said material and a proper position thereof can be ascertained before heating said material to shrink the same.

11. The method as recited in claim 7 wherein said self-lubricated bearing so manufactured is adapted for installation in an operating application with said inner member stationary in such installation and in a manner such that loads applied to said bearing on said outer member are transmitted to said stationary inner member through said self-lubricated liner on said outer surface of said inner member.

12. The method as recited in claim 7 wherein said length of heat shrinkable material is tubing with the latter having a dimensional length, wherein said liner has a dimensional width on the outside surface of said inner member, wherein said dimensional length on said tubing is such as to cover said liner over its dimensional width, and wherein said liner is secured to said outside surface of said inner member when heat is applied to said shrinkable material tubing to shrink the latter and apply pressure as an assembly fixture of said liner.

13. The method as recited in claim 7 wherein said length of heat shrinkable material comprising said disposable assembly fixture is tubing having circumferential and length dimensions, which tubing shrinks upon said application of heat thereto to apply a pressure to said liner and secure the same to said outside surface of said inner member, and the step of acting on said shrunken tubing to remove the same as said disposable assembly fixture when said securing of said liner is complete.

14. The method as recited in claim 7 wherein said heat shrinkable material which comprises said disposable assembly fixture is a plastic material in a tubing form with a circumferential dimension and a length dimension which together permit said fixture to circumferentially surround and cover said liner that is applied on said outside surface of said inner member, and wherein said fixture acts to apply pressure on said liner and secure the same to said outside surface when heat is applied to said fixture to shrink the same.

* * * * *